Oct. 8, 1957 S. I. RAMBO ET AL 2,809,293
ELECTRONIC PROTECTION SYSTEM
Filed March 20, 1953

WITNESSES:
John E. Hurley
Charles F. Renz

INVENTORS
Sheldon I. Rambo and
Theodore P. Kinn
BY
F. E. Crowder
ATTORNEY

United States Patent Office 2,809,293
Patented Oct. 8, 1957

2,809,293

ELECTRONIC PROTECTION SYSTEM

Sheldon I. Rambo and Theodore P. Kinn, Baltimore, Md., assignors to Westinghouse Electric Corporation, East Pittsburgh, Pa., a corporation of Pennsylvania Application March 20, 1953, Serial No. 343,754

6 Claims. (Cl. 250—36)

Our invention relates to high-frequency generator circuits and more particularly to circuits for the protection of high frequency generators or oscillators from transients resulting from rapid changes in load conditions.

It is an object of our invention to provide an improved protective circuit for high frequency generators which will respond to rapid changes in load condition to prevent overvoltage or overcurrent.

It is another object to provide a protective circuit for high frequency generators which is responsive to the rate of change of voltage or current.

Still another object is to provide an automatically recycling protective circuit for protecting high frequency generators.

Figure 1:
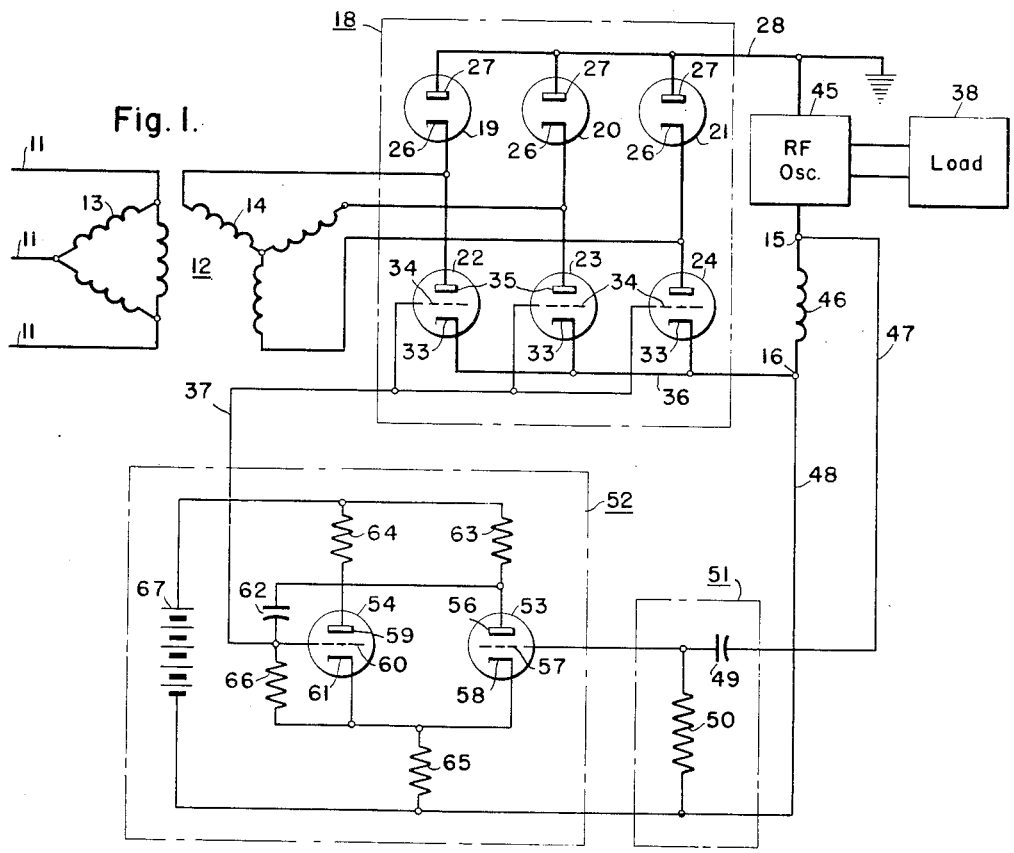
Figure 2:
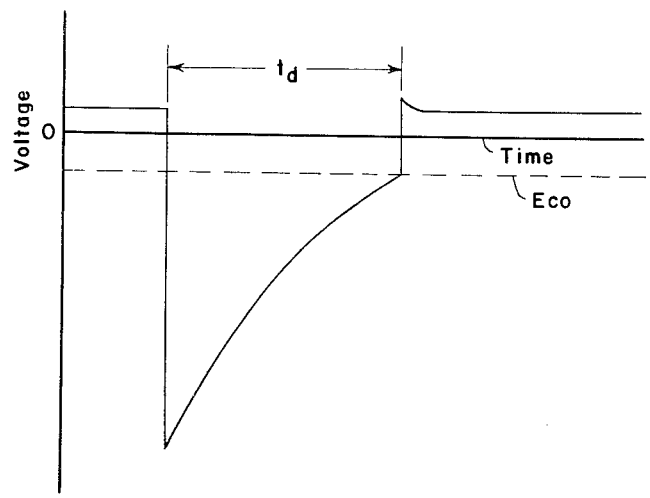

These and other objects are effected by our invention as will be apparent from the following description and claims taken in accordance with the accompanying drawings, in which:

Fig. 1 is a schematic diagram, showing a preferred embodiment of our invention; and Fig. 2 is a graph illustrating the change in control voltage caused by a rapid change in voltage in the load circuit of the schematic diagram.

Referring in detail to Fig. 1, the reference numeral 12 illustrates a three-phase transformer having a delta-connected primary winding 13 and a wye-connected secondary winding 14. A source of 110-volt three-phase power is connected to the primary windings 13 of the transformer 12 by means of the leads 11. The secondary windings 14 of the transformer 12 are connected to a full wave rectifier 18.

The full-wave rectifier 18 comprises six electronic tubes, 19, 20, 21, 22, 23 and 24 of the rectifying type. The electronic tubes 19, 20 and 21 are of the ordinary diode rectifier type while the electronic tubes 22, 23 and 24 are of the well-known thyratron type tube. The thyratrons 22, 23 and 24 each have a cathode 33, a control grid 34 and plate 35. The cathodes 33 of the tubes 22, 23 and 24 are all connected together by a common connector 36. The control grids 34 of the tubes 22, 23 and 24 are all connected together by a common conductor 37.

The diode rectifier tubes 19, 20 and 21 each have a cathode 26 and plate 27. The plates 27 of the tubes 19, 20 and 21 are all connected together by a common conductor 28. The cathode 26 of the diode 19 is connected to the plate electrode 35 of the thyratron 22. The common connection between the cathode 26 of tube 19 and the plate 35 of tube 22 is connected to one phase of the secondary winding 14 of the transformer 12.

The cathode 26 of the tube 20 is connected to the plate 35 of the thyratron 23. The common connection between the cathode 26 of the tube 20 and the plate 35 of the thyratron 23 is connected to a second phase of the secondary winding 14 of the transformer 12.

The cathode 26 of the tube 21 is connected to the plate 35 of the thyratron 24. The common connection between the cathode 26 of the tube 21 and the plate 35 of the thyratron 24 is connected to a third phase of the secondary winding 14 of the transformer 12.

The plate electrodes 27 of the diode tubes 19, 20 and 21 are connected to one terminal of a high frequency generator 45 through the conductor 28. The cathodes 33 of the thyratrons 22, 23 and 24 are connected to the other terminal of the high frequency generator 45 through the conductor 36 and an inductor 46. In some applications it may be desirable to replace the inductor 46 with a combination of inductance and resistance or a resistor having a low resistance value. A conventional load 38 is connected to the high frequency generator 45.

A conductor 47 is connected to the upper terminal 15 of the inductor 46 and is connected to a condenser 49, while a conductor 48 connected to the lower terminal 16 of the inductance 46 is connected to the lower terminal of a resistor 50. The free terminal of the condenser 49 is connected to the upper end of the resistor 50. The combination of the resistor 50 and the condenser 49 make up a differentiator circuit 51.

A one-shot or mono-stable multivibrator circuit 52 is connected across the terminals of the resistor 50. The multivibrator circuit 52 comprises two electronic tubes 53 and 54 of the triode type and associated circuits and elements. The upper terminal of the resistor 50 is connected to the grid 57 of the tube 53. The plate 56 of the tube 53 is connected through a plate resistor 63 to the positive side of a voltage supply 67. The cathode 58 of the tube 53 is connected through a resistor 65 to the negative side of the voltage supply 67 and the lower terminal of the resistor 50. The plate 56 of the tube 53 is also connected to the grid 60 of the tube 54 through a coupling condenser 62. The plate 59 of the tube 54 is connected by means of a plate resistor 64 to the positive side of the power supply 67. The cathode 61 of the tube 54 is connected to the cathode 58 of the tube 53. A resistor 66 is connected between the grid 60 and the cathode 61 of the tube 54.

The multivibrator 52 is connected to the rectifier 18 by means of a conductor 37. The conductor 37 connects the grid 60 of the tube 54 to each of the control grids 34 of the thyratrons 22, 23 and 24.

In the normal operation of our circuit, a suitable three-phase voltage supply will be connected by means of conductors 11 to the primary winding 13 of the transformer 12. Alternating voltages will be supplied to the full-wave rectifier 18 from the secondary winding 14 of the transformer 12. A D.-C. voltage will be supplied from the full-wave rectifier 18 by means of the leads 23 and 36 and impressed on the oscillator 45 through the inductance 46.

Under normal load conditions the voltage across the inductor 46 will be constant or slowly changing. The values of the resistor 50 and the condenser 49 of the differentiator circuit are selected so that the voltage across the resistance 50 will vary only a small amount under normal conditions. Therefore, the voltage applied to the tube 53 of the multivibrator 52 under normal conditions will not change the stable state of the multivibrator 52.

The multivibrator 52 is in a stable condition under normal operating conditions of the oscillator 45. The biasing voltages on the grids 60 and 57 of the tubes 54 and 53 respectively are adjusted so that the tube 54 will be conducting and tube 53 will be cut off under normal operating conditions of the oscillator 45. The voltage impressed on the grids 34 of the thyratrons 22, 23 and 24 by means of conductor 37 from the grid 60 of the tube 54 will be positive and have no adverse effect on the operation of the thyratrons 22, 23 and 24.

If the load 38 on the oscillator 45 is suddenly removed, shorted or otherwise changed, there will be a rapid change in the voltage developed across the inductor 46. This rapid change of voltage across the inductor 46 is applied to the differentiator circuit 51. A positive voltage pulse is developed across the resistance 50 and applied to the grid 57 of the tube 53. This is a well known principle of the differentiator circuit 51 due to the fact that the charge on a condenser 49 cannot change in value instantaneously.

The positive pulse applied to the grid 57 of the tube 53 will trigger the multivibrator 52, that is, cause tube 53 to start conducting and tube 54 to become non-conducting. This action of a mono-stable multivibrator is well known in the art.

When the multivibrator circuit 52 is triggered by the positive pulse, as explained above, a negative voltage is delivered to the grids 34 of the thyratrons 22, 23 and 24, as a result of the grid 60 of tube 54 being driven negative by the multivibrator action. The negative pulse delivered to the grids 34 of the thyratrons 22, 23 and 24 by means of the lead 37 biases the thyratrons beyond cut-off. Since each thyratron 22, 23 and 24 allows conduction of current during ⅓ of the cycle, the negative bias applied to the grids 34 of the thyratrons 22, 23 and 24 will cut off the rectifier 18 and as a result cut off the direct current power supplied to the generator 45. It is seen from this action that our circuit provides a rapidly responding protective circuit for removing power from the oscillator 45 upon rapid changes in the load 38.

In Fig. 2, we have shown the negative voltage developed at the grid 60 of the tube 54 when a positive pulse is applied to the multivibrator circuit 52. The time that the direct current power is removed from the electronic oscillator 45 can be adjusted by varying the value of the resistor 66 or the condenser 62 or both.

While we have shown our invention in a single form, it will be obvious to those skilled in the art that it is not so limited, but is susceptible of various other changes and modifications without departing from the spirit and scope thereof.

We claim as our invention:

1. In combination with a high-frequency generator for supplying an output voltage to a load, a source of energizing voltage for said generator, said source including a first control tube which is normally conductive, a differentiator circuit connected to said generator to derive voltage pulses corresponding to the time-rate of change of said generator output voltage, a second grid controlled tube having said voltage pulses applied to the control grid thereof and operative to conduct in response to voltage pulses of a predetermined magnitude, control circuit means responsive to conduction of said second tube to apply a negative biasing voltage to said first control tube for rendering said tube non-conductive, and means included in said control circuit for maintaining said second tube conductive for a predetermined period of time.

2. A protective system for a generator for supplying an output voltage to a load, said protective system including rectifier means for supplying direct current voltage to said generator, said rectifier means including an electronic tube having an anode electrode, a cathode electrode and a control electrode, said tube being normally conductive when said rectifier means is supplying direct current voltage, first circuit means including a differentiator circuit connected to said generator to derive positive voltage pulses corresponding in amplitude to the time-rate of change of said output voltage, control means including a normally non-conductive discharge device having a control electrode with said control electrode being connected to said first circuit means so as to initiate conduction of said discharge device in response to a positive voltage pulse of a predetermined amplitude, and second circuit means for applying the output of said control means to said control electrode of said electronic tube to bias said electronic tube to non-conducting condition whereby the supply of said direct current voltage to said generator is interrupted for a predetermined period of time substantially exceeding the duration of said positive voltage pulse.

3. In combination with a high-frequency generator for supplying an output voltage to a load, a three-phase rectifier for supplying direct current voltage to said generator, said rectifier including a rectifier tube in each of the three phases, with each of said tubes having an anode electrode, a cathode electrode and a control electrode, first circuit means for deriving a voltage pulse proportional to the time-rate of change of said output voltage control means including a normally non-conductive grid-controlled electron tube having its grid connected to said first circuit means so that said voltage pulse is operative to initiate conduction in said normally non-conductive tube, and second circuit means including a time constant network for applying the output of said control means to said control electrode of each of said rectifier tubes to bias said rectifier tubes to a nonconductive condition to remove direct current voltage from said generator for a predetermined time exceeding the time duration of said voltage pulse.

4. In a protective circuit for an electronic oscillator, a rectifier connected to said oscillator and operative for supplying direct current voltage to said oscillator, an impedance connected in series between the output of said rectifier and said electronic oscillator, a differentiator circuit connected across said impedance, a multivibrator connected across said differentiator circuit, and circuit means deriving a voltage from said multivibrator to render said rectifier inoperative.

5. In combination with an electronic oscillator for supplying energy to a load, a three-phase full-wave rectifier for supplying power to said oscillator, an inductance connected in series between the output of said rectifier and said oscillator, first circuit means for deriving a positive voltage pulse from said inductance in response to an unloading of said oscillator, a multivibrator connected to said first circuit means, and second circuit means for deriving a negative pulse from said multivibrator circuit to control the voltage output of said rectifier.

6. In combination with a high frequency generator for supplying an output voltage to a load, a three-phase full-wave rectifier for supplying direct current voltage to said generator, said rectifier including a multielectrode tube in each phase, each of said tubes having at least an anode electrode, a cathode electrode and a control electrode, first circuit means connected to said generator for producing a first voltage pulse proportional to output voltage and including a resistance-capacitance differentiating circuit connected to said generator, control circuit means responsive to a predetermined voltage amplitude of said pulse and including a normally non-conductive grid-controlled electron tube having its grid-cathode circuit responsively associated with said differentiating circuit, time-constant means for producing a negative voltage pulse of predetermined time duration in response to said first voltage pulse, and second circuit means for coupling the output of said control means to the control grids of each of said multielectrode tubes to bias said multielectrode tubes beyond cut-off.

References Cited in the file of this patent

UNITED STATES PATENTS

| | | |
|---|---|---|
| 2,029,270 | Mertens | Jan. 28, 1936 |
| 2,141,927 | Morack | Dec. 27, 1938 |
| 2,196,413 | Gulliksen | Apr. 9, 1940 |
| 2,479,548 | Young | Aug. 16, 1949 |
| 2,570,798 | Gullick | Oct. 9, 1951 |
| 2,661,425 | Mittelmann | Dec. 1, 1953 |
| 2,707,742 | Juhola | May 3, 1955 |